United States Patent
Weth

[11] Patent Number: 5,984,209
[45] Date of Patent: Nov. 16, 1999

[54] METHOD FOR THE DELIVERY OR RECEPTION OF UNIFORM QUANTITIES OF LIQUIDS OR GASES, AND HOSE WITH A SHAPED CROSS-SECTION FOR USE IN THE METHOD

[76] Inventor: Nikolaus Weth, D-76889, Schweigen-Rechtenbach, Germany

[21] Appl. No.: 08/952,066

[22] PCT Filed: Apr. 29, 1996

[86] PCT No.: PCT/EP96/01787

§ 371 Date: Nov. 3, 1997

§ 102(e) Date: Nov. 3, 1997

[87] PCT Pub. No.: WO96/35325

PCT Pub. Date: Nov. 14, 1996

[30] Foreign Application Priority Data

May 11, 1995 [DE] Germany .............................. 195 17 200
Mar. 4, 1996 [DE] Germany .............................. 196 08 230

[51] Int. Cl.⁶ .............................. A01G 27/00; B05B 1/30
[52] U.S. Cl. .......................... 239/547; 239/145; 239/542; 239/533.13; 239/DIG. 12; 138/114

[58] Field of Search ..................................... 239/145, 542, 239/547, 533.13, DIG. 12; 138/114, 111

[56] References Cited

U.S. PATENT DOCUMENTS

| | | | |
|---|---|---|---|
| 2,771,320 | 11/1956 | Korwin | 239/533.13 X |
| 3,727,845 | 4/1973 | Bohlman | 239/533.13 X |
| 3,899,135 | 8/1975 | O'Brian | 239/533.13 |
| 3,980,104 | 9/1976 | Kabai | 239/547 X |
| 4,452,397 | 6/1984 | Barton | 239/547 X |
| 4,948,295 | 8/1990 | Pramsoler | 239/542 X |
| 5,129,758 | 7/1992 | Lindstrom | 239/533.13 |

*Primary Examiner*—Andres Kashnikow
*Assistant Examiner*—Robin O. Evans
*Attorney, Agent, or Firm*—George W. Dishong

[57] ABSTRACT

The invention concerns an elastic hose with a shaped unsymmetrical cross-section for the delivery of liquids or gases through apertures along the hose, the delivery rate being uniform even over long lengths of hose. The hose is optionally housed in an outer tension-proof cover tube with an open cross-section, in particular a tube open along a generatrix, for the reception of additioned liquids or gases.

13 Claims, 2 Drawing Sheets

METHOD FOR THE DELIVERY OR RECEPTION OF UNIFORM QUANTITIES OF LIQUIDS OR GASES, AND HOSE WITH A SHAPED CROSS-SECTION FOR USE IN THE METHOD

FIELD OF THE INVENTION

The invention relates to an elastic hose with a deformed asymmetrical cross-section for the uniform discharge of liquids or gases via openings which are arranged along the hose and over long hose lengths.

The invention also relates to a method of discharging liquids, gases or fluids into the surroundings, such as the ground or water surfaces, and/or taking in liquids, gases or fluids from said surroundings, via discrete openings distributed in the longitudinal direction, in particular for the purpose of "in situ" treatment.

BACKGROUND OF THE INVENTION

In the case of such cross-sectionally deformed hoses which have wall thicknesses which are adapted in accordance with the functioning principle and are intended for the uniformly metered discharge, or the uniform extraction by suction, of liquids or gases over long lengths by way of outlet locations which are arranged lengthwise at certain distances apart, possible categories are "the admission/extraction of air" and "the admission/extraction of water" with the special criteria of "uniform large-surface-area treatment".

In the case of the already known hoses for the metered discharge of gases or liquids, the outlet quantity at the individual outlet locations depends on the internal pressure at the site where they are arranged. The feed-in pressure provided at one hose end drops sharply as the hose length increases (due to friction and branching losses). Along the hose, this results in normally large differences in outlet quantities at the openings, with the result that, for this reason, only short hose lengths are used if there is a need for a relatively uniform liquid or gas discharge per meter.

The uniform discharge is also adversely affected if mechanical drilling in plastics produces burrs in the bore. In the case of a change in pressure, these burrs are forced into the openings again. This results in outlet openings of different sizes, through which, both in the pressureless state and in the pressurized state, the discharge of uniform quantities at each outlet location is not possible.

SUMMARY OF THE INVENTION

The object of the invention is to develop hoses or the like which are introduced over long lengths, such that their function is not lost as a result of the large laying forces to which they are subjected.

Surprisingly, this is achieved, in the case of a hose of the type mentioned in the introduction, in that, for the purpose of optionally taking in additional liquids or gases, an outer tension-resistant draw-in tube with an open cross-section, in particular open along a generatrix, is provided for accommodating the elastic hose.

In the rest state, the initial cross-sections of the elastic hose can preferably be semicircular, four-sided or pinched-in.

It is favourable if the elastic inner hose is reinforced, in particular in the region of the opening-free walls.

It is favourable to have a filter material between the inner hose and draw-in tube, this filter material preventing extremely fine particles from blocking the openings during take in.

Some walls preferably contain these holes, which are cylindrical in the rest state, of an elasticity such that the through-passage cross-section of these holes is reduced considerably in the case of deformation as a result of superatmospheric pressure/subatmospheric pressure.

Use may be made of a highly elastic acid-proof/alkali-proof temperature-adapted hose.

The hole ducts may also be designed conically with a cross-section which, depending on the application case, increases or decreases from the inside towards the outside.

In accordance with the inventive method mentioned in the introduction, the invention is, moreover, distinguished in that a protective structure which is open along a generatrix and is intended for protecting the actual take in/discharge is provided between the external surroundings and the openings, and a filter material for the extremely fine material which otherwise blocks the take-in openings is provided between take in/discharge and the surroundings.

The method can be developed in that, in dependence on increasing superatmospheric pressure (discharge) and subatmospheric pressure (take in), the operating medium increasingly deforms or displaces outlet openings, by way of a change in curvature of an elastic, opening-containing structure, in order to set uniform quantities.

The method can be implemented particularly favourably when the openings are accommodated in a structure which is resistant to tensile stressing.

Further features of the invention can be gathered from the subclaims.

It cannot be denied that elastic hoses which consist of rubbers, plastic, PVC or thermoplastics and are in flattened form with cylindrical holes for discharging liquid and cleaning with gas, usually in the form of drainage tubes, are known per se.

The abovementioned object can be completely fulfilled by interaction of the measures according to the invention, in particular by the hose reinforcement, by the separate hose casing, by the temperature-adapted materials, by the tension-resistant design and the special cross-sections which may be used as appropriate (the holes can be made by laser, by punching, piercing or ultrasound).

The walls are thus partially encased; they are tension-resistant on the outside. Hole deformation during introduction is thus not to be expected.

It is clear to the person skilled in the art that such structures are suitable for take in and discharge, in particular for in situ treatment. The combination of elastic inner hoses which have their cross-section deformed in a defined manner, and may or may not have reinforcement, and less elastic tension-resistant outer casings which are open in the longitudinal direction protects the inner hose against tensile strain and soiling.

The single-material disposal which is made possible by the separate hoses is obviously also favourable, this disposal being as important today as design features were formerly.

The use of the word "temperature-adapted" above means that, in dependence on the surrounding ground and water temperature, the plastic of the hose remains elastic (appropriate Shore hardness) in order to ensure an optimum regulating action. It is known that plastics change their elasticity at different temperatures.

The abovementioned conical holes in the rest state are achieved if, during the operation to make the holes, the hose is subjected to stressing; in this case a cylindrical hole is then drilled. This hole then becomes conical in the rest state. This measure has the effect of preventing particles of dirt from passing into the interior of the hose in the rest state.

BRIEF DESCRIPTION OF THE DRAWINGS

Exemplary embodiments of the invention will now be explained in more detail with reference to the accompanying drawings, in which.

DESCRIPTION OF THE PREFERRED EMBODIMENTS

Figure 1:
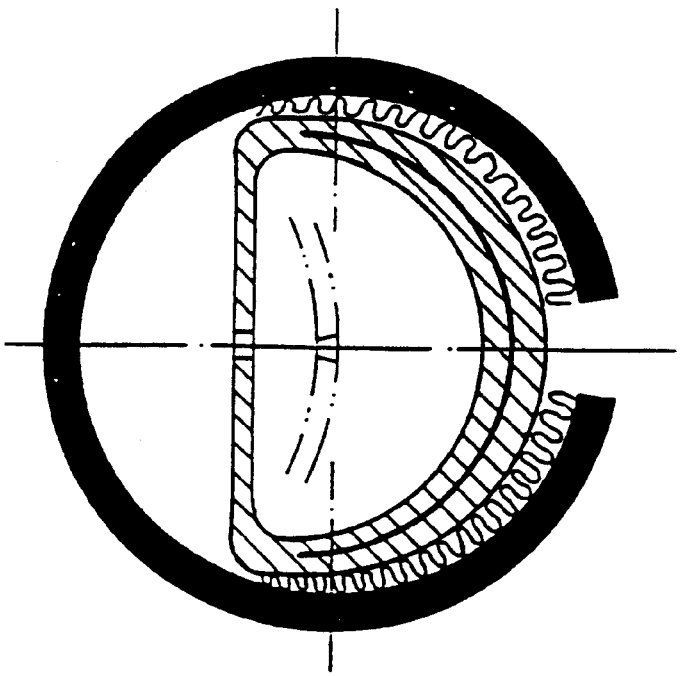
FIG. 1 shows one embodiment.

FIG. 1 shows a highly elastic acid-proof/alkali-proof temperature-adapted hose which has a continuous, semicircular cross-sectional deformation and is provided lengthwise, in the flat wall side, with cylindrical inlet openings. Incorporated in the cross-sectionally round wall is a reinforcement which prevents the hose cross-section from collapsing when liquids or gases are taken in. This makes it possible for liquids or gases to be taken in uniformly over long lengths, with different subatmospheric pressures. This elastic hose is encased by a tension-resistant hose, in the form of a protective casing, which is open over the entire length, and is also referred to above as a "draw-in tube". As a result, the tensile forces, produced when elastic hoses are laid, which act on the hose and expand and damage the material are compensated for. Formerly, the openings in the hose wall were warped, with the result that the regulating mechanism for uniform take in was no longer ensured. The elastic hose is positioned in the protective casing such that the flattened section with the take-in opening is located in the closed rounded section of the hose, and the reinforced, semiround side of the elastic hose is directed towards the longitudinal opening of the hose.

On both sides of the slit in the protective hose, filter material is introduced between the semiround outer wall of the elastic hose and the inner wall of the protective casing, and this filter material both prevents the extremely fine particles from passing to the take-in opening and avoids the inner hose being sucked against the protective casing.

The deformation during take in is indicated by dashed lines. It can be seen that the previously cylindrical opening deforms conically, and the cross-section is thus reduced (is transformed or "displaced" into an ellipsoidal cross-section).

Figure 2:
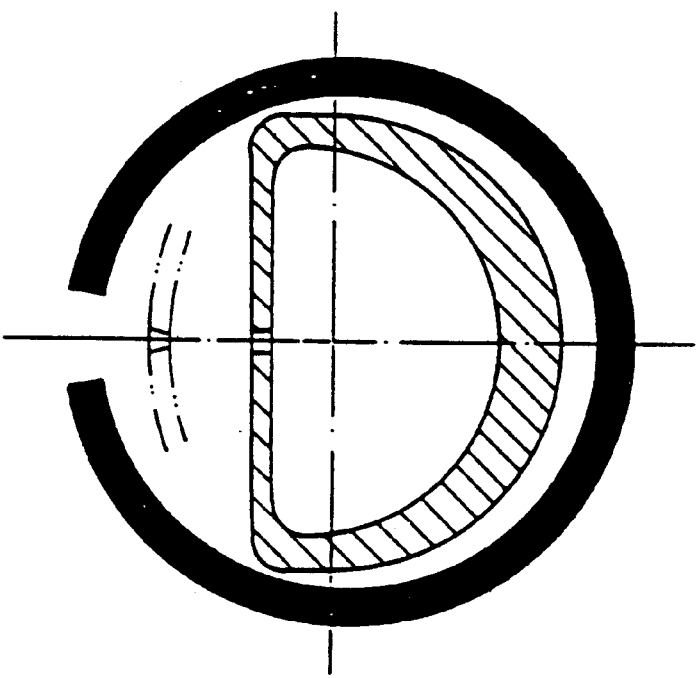
FIG. 2 shows a second embodiment for another purpose.

FIG. 2 is likewise a design with a semicircular cross-section corresponding to FIG. 1, but without the partial reinforcement. It shows a hose for discharge purposes. As a result, there is no need for any reinforcement of the elastic inner hose in this case, nor for any filter between the walls of the hoses. This elastic cross-sectionally deformed inner hose is brought into its operating position with the aid of a tension-resistant hose casing since, otherwise, the elastic material is expanded and/or damaged and the warping of the outlet opening means that the regulating mechanism is no longer ensured.

It is important that the elastic semicircular inner hose is positioned in the protective hose such that the outlet openings come to lie on the same side as the opening of the protective hose. The holes of the inner hose are thus aligned with the opening of the outer hose. Here too, the dashed line illustration shows how, in the case of increased discharge, the outer hose is expanded, and the openings are thus displaced and reduced in cross-section. This compensates for a drop in pressure, for example as a result of friction over long lengths.

Figure 3:
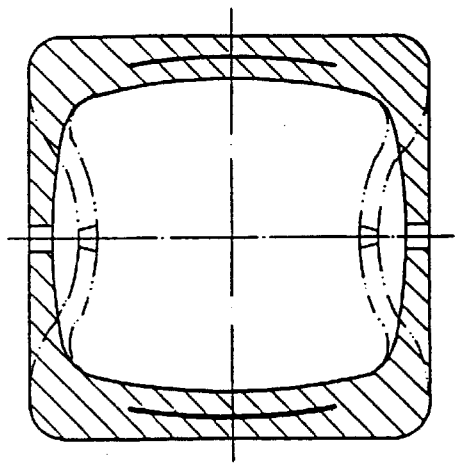
FIG. 3 shows a third embodiment.

FIG. 3 shows a special hose for taking in liquid chemicals on water surfaces. A highly elastic acid-proof/alkali-proof temperature-adapted hose, here with a square cross-section, is provided. The hose is reinforced (dark circle-arc piece) on two mutually opposite wall sides, and cylindrical take-in openings are provided, along the hose, on the other two, elastic sides. The material is of such a nature that the hose floats on the water surface, and the take-in openings can take in the lighter chemicals by way of subatmospheric pressure in the hose.

This design is for discharge and take-in purposes. This is illustrated by dashed lines again in the figure itself. In the case of superatmospheric pressure, the elastic wall is expanded and the cross-sections of the outlet openings become smaller; in the case of atmospheric pressure, the largest cross-section of the cylindrical hole is ensured. In the case of subatmospheric pressure, the cross-section becomes smaller again, as is depicted.

Figure 4:
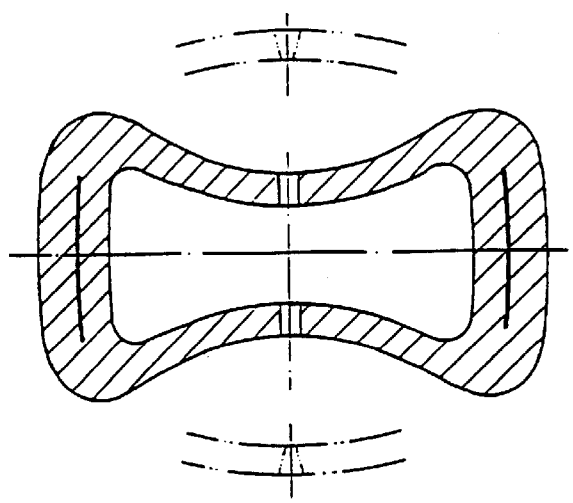
FIG. 4 shows a fourth embodiment.

FIG. 4 shows a highly elastic acid-proof/alkali-proof temperature-adapted discharge hose for liquids which has a pinched-in cross-sectional deformation and, by virtue of its reinforcement/wall strengthening on both sides, is insensitive to tensile forces during laying. In the drawing, the reinforcement is illustrated as a short, dark circle-arc piece, for example, in the short sides of the rectangular basic body with rounded corners and pinched-in longitudinal sides, in which the holes are provided, for example, centrally.

It is shown how the hose expands during discharge (this is a discharge hose) and how, consequently, the outlet openings become conical and the cross-section becomes smaller.

It is surprising that the measure of the invention also makes it possible to take in fluids (for example chemicals floating on the water or chemicals seeping into the ground).

I claim:

1. Hose system comprising:
   an elastic hose of deformable asymmetric or of basic geometric shapes and cross-section deformed with regard to the geometric shapes selected from the group consisting of semicircle, circle, triangle, rectangle, square, polygon, and ellipse;
   openings arranged along the elastic hose and over long lengths of the elastic hose, said opening for the uniform discharge of liquids or gases;
   an outer draw-in tube having a, non-closed cross-section, and being particularly open along a generatrix, for accommodating the elastic hose; and
   a partly elastic reinforcement of the elastic hose, said partly elastic reinforcement located particularly in those regions of walls of the elastic hose where the walls of the elastic hose have no openings.

2. The hose system according to claim 1, characterized in that the cross-sections of the elastic hose in rest condition are of half circle, rectangular or a preselected asymmetric cross-section—tailored shape.

3. The hose system according to claim 2, characterized in that the preselected asymmetric cross-section—tailored shape consists of a flat rounded cross-section shape having draw-in longitudinal sides.

4. The hose system according to claim 3, further comprising a filter material between the elastic hose and the outer draw-in tube.

5. The hose system according to claim 4, wherein the filter material is adequately configured to filter extremely fine particles which otherwise block the openings arranged along the elastic hose.

6. The hose system according to claim 1, characterized in that those walls which contain the openings arranged along the elastic hose, which openings are cylindrical in the rest state, are of an elasticity such that the through-passage cross-section of these openings is reduced in the case of deformation as a result of superatmospheric pressure/subatmospheric pressure.

7. The hose system according to claim 1, characterized in that, in the case of the elastic hose cross-section being the semi-circular cross-section, the semi-circular cross-section having a flat wall side and a semi-round side thereof, the cylindrical inlet openings for take-in purposes are provided in the flat wall side, the reinforcement being incorporated in the round side of the wall.

8. The hose system according to claim 7, characterized in that the flat wall side with the cylindrical inlet openings for take-in purposes is located in the closed round section of the draw-in tube/protective hose, and the reinforced, semi-round side of the elastic hose is directed towards the longitudinal opening of the outer draw-in tube.

9. The hose system according to claim 1, characterized in that, for taking in liquid chemicals on water surfaces, the elastic hose is designed with a substantially square cross-section, which is reinforced on two mutually opposite wall sides, and has cylindrical take-in openings, along the elastic hose, on the other two mutually opposite, elastic wall sides, the material is of such a nature that the elastic hose floats on water surface, and the take-in openings can take in the lighter chemicals by way of subatmospheric pressure in the interior region of the elastic hose.

10. The hose system according to claim 1, characterized in that, in the design of the hose system as a discharge hose system, the elastic hose for liquids is provided with a pinched-in cross-section deformation and, by virtue of reinforcement/wall strengthening on both side, is insensitive to tensile forces during laying of the elastic hose.

11. The hose system according to claim 1, characterized in that the the openings arranged along the elastic hose are designed conically with a cross-section which, depending on the application case, increases or decreases from the inside towards the outside.

12. The hose system according to claim 1, characterized in that, for discharge purposes the openings arranged along the elastic hose are located in a concave deformation, and for take-in purposes, the openings arranged along the elastic hose are located in a convex deformation.

13. The hose system according to claim 12, characterized in that, in the case of asymmetric hose profiles, one or more of the openings arranged along the elastic hose are located in the deformable portion of the elastic hose segment.

* * * * *